Dec. 15, 1931.      G. T. RONK      1,836,339

BEARING FOR CABLE DRUMS AND THE LIKE

Filed Aug. 6, 1928

Inventor.
George T. Ronk.
by Owing & Hague Atty's.

Patented Dec. 15, 1931

1,836,339

UNITED STATES PATENT OFFICE

GEORGE T. RONK, OF CEDAR RAPIDS, IOWA

BEARING FOR CABLE DRUMS AND THE LIKE

Application filed August 6, 1928. Serial No. 297,832.

This invention relates to improvements in bearings for mounting cable drums of that type designed to be used in connection with excavating machines of various types, and particularly to that type of cable drums mounted on a fixed shaft and having conical roller bearings. The difficulty with this type of bearings lies in the fact that the ordinary operator of ditching machines is not capable of properly adjusting this type of bearings.

It is therefore the object of my invention to provide means whereby the drum and bearing may be assembled in a single unit and adjusted on a bench, and later applied to the shaft on which the drum is designed to operate, and having means whereby the said bearing and drum may be easily and quickly attached or detached and rigidly secured in position, thus providing means whereby the operator may easily and quickly remove the drum and its bearing from the shaft and take it to the nearest automobile garage where the bearings may be adjusted by men familiar with this type of bearing.

My invention consists in the construction, arrangement and combination of the various parts of the device, whereby the objects contemplated are attained, as hereinafter more fully set forth, pointed out in my claims, and illustrated in the accompanying drawings, in which:

Figure 2:
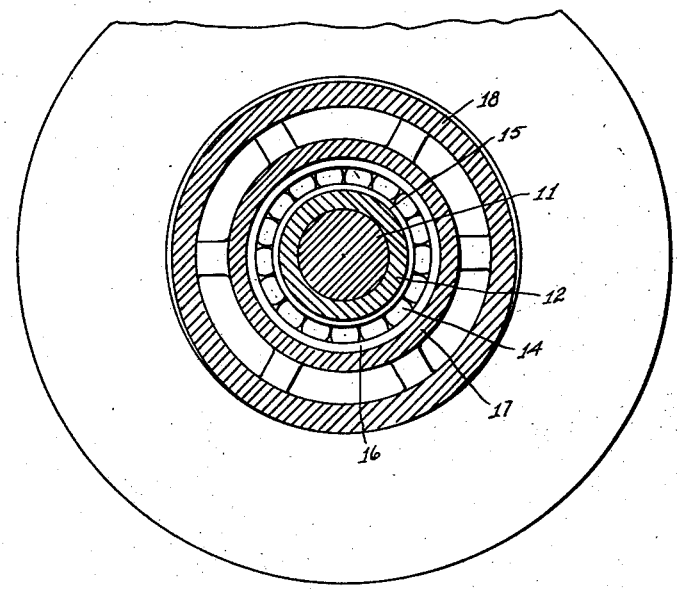
Figure 2 is a sectional view taken on the line 2—2 of Figure 1.
Figure 1:
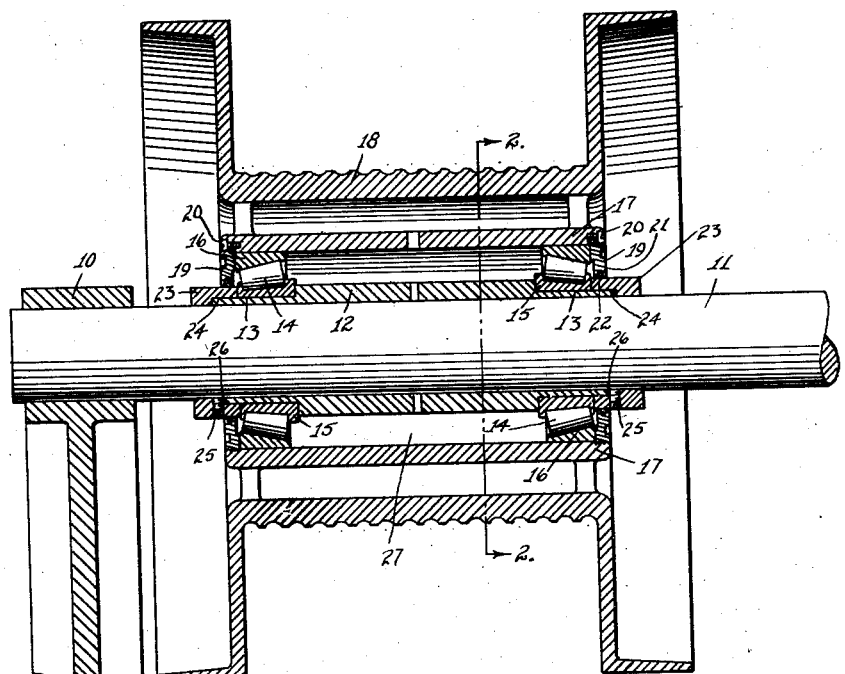
Figure 1 is a longitudinal sectional view of the drum and the bearing for supporting the same, showing the manner in which they are applied to the fixed shaft.

The numeral 10 indicates a support in which is mounted a fixed shaft 11. Supported on the shaft 11 is a sleeve 12, each end of which is provided with a contracted portion 13. Each of the contracted portions 13 is designed to carry a conical roller bearing 14 of the ordinary type. Each of the contracted portions has a fixed race 15 mounted on the sleeve 12. Rotary races 16 are mounted in the hub 17 of the cable drum 18. The races 16 are adjustably mounted in said hub by means of annular adjusting plates 19, said plates being threaded into the ends of the hub 17 and locked in an adjusted position by means of set screws 20.

The inner edge of the annular members 19 are provided with an annular groove 21 in which is mounted a packing 22.

The sleeve 12 is adapted to be slid on to and off of the end of the shaft 11 and to carry with it the bearings 14, the hub 17 and the drum 18, thus providing a complete bearing when assembled, in which the proper adjustment of the rollers 14 may be made through the annular members 19. Said adjustment is made by placing the sleeve 12 on a temporary mandrel or shaft, after which the sleeve 12 may be placed on the shaft 11.

The said sleeve 12 may then be secured against longitudinal movement by means of collars 23, each of which has its inner edge provided with an annular groove or recess 24 for receiving the outer ends of the portions 13. The inner ends of the collars 23 are designed to abut the outer ends of the fixed races 15. Said collars 23 are fixed to the shaft by suitable set screws 25, which extend through grooves 26 in the ends of the members 13, and thus provide means for anchoring the sleeve against any slight rotary movement relative to the shaft, which might be caused by the friction of the rollers 14 with the members 15 as the drum is rotated.

The inner ends of the collars 23 rest within the members 19 and within the packing 21. Said packing makes contact with the periphery of said collars to form an oil tight joint between the collar and the members 19. This space 27 between the sleeve 12 and the hub 17 may be filled, or partially filled, with oil or grease.

Thus it will be seen that I have provided a very simple and inexpensive means whereby the conical bearing members may be adjusted within the cable drum by a skilled mechanic, and applied to the shaft of the machine on which the device is to be operated by an unskilled mechanic or operator.

This arrangement is very desirable in the manufacturing process of the machine on which the drum is used, as the machine may be built in various units, which may be adjusted and assembled within themselves and placed in stock, so that the completed machine may be easily and quickly assembled when so desired.

I claim as my invention:

1. In a device of the class described, a drum hub having an opening, a sleeve supported therein, each end of said sleeve being provided with a contracted cylindrical portion, roller bearings for rotatively mounting said hub on said sleeve, the inner races of said bearings being supported by the contracted portions of said sleeve, the outer races of said bearings being mounted in said hub, means for adjusting said outer races within said hub and with respect to the rollers of said bearings and said inner races, and means for fixing the inner races of said bearings against outward movement longitudinally of said sleeve, and said sleeve against longitudinal and rotary movement when mounted on a shaft, said means comprising a collar supported at each end of said sleeve, the inner ends of the inner faces of said collars being designed to engage the outer faces of the inner races of said bearings and provided with an annular recess to overlap the ends of the contracted portions of said sleeve, and set screws projecting through the overlapping portion of said collars and through the contracted portions of said sleeves and into engagement with the shaft on which the sleeve is mounted.

2. In a device of the class described, a drum hub having an opening, a sleeve supported therein, each end of said sleeve being provided with a contracted cylindrical portion, a roller bearing for each end of said sleeve, the inner races of said bearings being mounted on said contracted portions, means for fixing the inner races of said bearings against outward movement longitudinally of said sleeve and said sleeve against longitudinal and rotary movement when mounted on said shaft, said means comprising a collar supported at each end of said sleeve, the inner ends of the inner faces of said collars being designed to engage the outer faces of the inner races of said bearings and provided with an annular recess to overlap the ends of the contracted portions of said sleeve, set screws projecting through the overlapping portions of said collars and through the contracted portion of said sleeves, and into engagement with the shaft on which the sleeve is mounted.

GEORGE T. RONK.